United States Patent
Rogers et al.

(10) Patent No.: US 12,110,798 B1
(45) Date of Patent: Oct. 8, 2024

(54) BLADE OUTER AIR SEAL WITH MACHINABLE COATING

(71) Applicant: RTX CORPORATION, Farmington, CT (US)

(72) Inventors: Mikayla Rogers, Portland, ME (US); Joseph Micucci, Scarborough, ME (US); Daniel Rogers, Lyman, ME (US); Morely Sherman, Portsmouth, NH (US); Danielle Mahoney, Granby, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/428,956

(22) Filed: Jan. 31, 2024

(51) Int. Cl.
*F01D 11/12* (2006.01)
*F01D 11/08* (2006.01)

(52) U.S. Cl.
CPC ............ *F01D 11/08* (2013.01); *F01D 11/122* (2013.01); *F05D 2220/32* (2013.01); *F05D 2230/22* (2013.01); *F05D 2230/312* (2013.01); *F05D 2230/90* (2013.01); *F05D 2240/11* (2013.01); *F05D 2300/6033* (2013.01)

(58) Field of Classification Search
CPC ........ F01D 11/08; F01D 11/12; F01D 11/122; F05D 2230/90; F05D 2240/11; F05D 2300/6033

See application file for complete search history.

(56) References Cited

U.S. PATENT DOCUMENTS

| | | | |
|---|---|---|---|
| 7,563,071 B2 * | 7/2009 | Campbell | F01D 9/04 415/173.1 |
| 7,641,440 B2 * | 1/2010 | Morrison | F23R 3/007 415/174.4 |
| 9,803,496 B2 | 10/2017 | Lutjen et al. | |
| 9,945,242 B2 * | 4/2018 | Tura | F02C 3/04 |
| 10,012,100 B2 * | 7/2018 | Vetters | F01D 11/12 |
| 11,131,206 B2 * | 9/2021 | Strock | C23C 28/30 |

* cited by examiner

*Primary Examiner* — Eldon T Brockman
(74) *Attorney, Agent, or Firm* — Carlson, Gaskey & Olds, P.C.

(57) ABSTRACT

A gas turbine engine includes a compressor section, a combustor section and a turbine section for rotation on an axis. The turbine section includes at least one row of rotating turbine blades each having a radially outer tip. A blade outer air seal is positioned radially outwardly of the radially outer tip. The blade outer air seal has a central web positioned radially outwardly of the radially outer tip. The blade outer air seal has an upstream mount arm and a downstream mount arm receiving mount structure from a static structure. The static structure has sealing members engaging an upstream outer surface of the upstream mount arm at an upstream seal material and a downstream outer surface of the downstream mount arm at a downstream seal material. A method is also disclosed.

20 Claims, 2 Drawing Sheets

BLADE OUTER AIR SEAL WITH MACHINABLE COATING

BACKGROUND OF THE INVENTION

This application relates to the use of machinable coatings to provide sealing surfaces on a blade outer air seal.

Gas turbine engines typically include a fan delivering air into a bypass duct as propulsion air, and into a core engine. The core engine air moves into a compressor section where it is compressed and delivered into a combustor. The air is mixed with fuel and ignited in the combustor and passed downstream over turbine rotors driving them to rotate. The turbine rotors in turn rotate the fan and compressor rotors.

Improving the efficiency of gas turbine engines is important. To maximize the volume of the products of combustion passing over the turbine rotors, a blade outer air seal ("BOAS") is placed radially outwardly of turbine blades to block the flow of products of combustion from avoiding the turbine blades.

There is a need for BOAS with improved temperature, environmental, and wear resistance for use in the operating conditions in a gas turbine engine.

SUMMARY OF THE INVENTION

A blade outer air seal according to an exemplary embodiment of this disclosure, among other possible things includes a center web having a first surface and a second surface opposite the first surface, and first and second faces joining the first surface to the second surface. The blade outer air seal also includes first and second mounting arms extending from the second surface. The second surface has a center portion between the first and second mounting arms and first and second side portions on either side of the center portion. The blade outer air seal also includes a continuous abradable coating disposed on the first surface of the center web, at least one of the first and second faces, and at least one of the first and second side portions of the second surface.

In a further example of the foregoing, the continuous abradable coating is a first continuous coating segment. Each of the mounting arms have an inner surface facing the center portion of the second surface and an outer surface opposite from the inner surface. The blade outer air seal also includes a second continuous abradable coating segment disposed on the center portion of the second surface and the inner surfaces of each of the mounting arms.

In a further example of any of the foregoing, the blade outer air seal comprises a ceramic matrix composite material.

In a further example of any of the foregoing, the blade outer air seal comprises a monolithic ceramic material.

In a further example of any of the foregoing, the coating comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

A gas turbine engine according to an exemplary embodiment of this disclosure, among other possible things includes a turbine section arranged along a central engine axis. The turbine section has a turbine with at least one blade rotatable around the central engine axis. The at least one blade has a tip. The gas turbine engine also includes at least one blade outer air seal arranged radially outward from the tip and attached to an engine static structure. The blade outer air seal includes a web having a radially inner surface adjacent the tip and a radially outer surface, a forward face and an axial face joining the radially inner surface and radially outer surface. First and second mounting arms extend radially outward from the radially outer surface. The radially outer surface of the web has a forward portion, an aft portion, and a center portion between the first and second mounting arms. The blade outer air seal also includes a continuous abradable coating disposed on the radially inner surface of the web, and at least one of the forward portion and aft portion of the radially outer surface.

In a further example of the foregoing, the continuous abradable coating is disposed on the forward portion of the radially outer surface and the forward face of the web.

In a further example of any of the foregoing, the continuous abradable coating is a first continuous coating segment. The gas turbine engine also includes a second continuous coating segment disposed on an aft surface of the first mounting arm, a forward surface of the second mounting arm, and the center portion of the radially outer surface.

In a further example of any of the foregoing, the blade outer air seal comprises a ceramic matrix composite material.

In a further example of any of the foregoing, the continuous abradable coating is disposed on the forward portion of the radially outer surface and the forward face of the web.

In a further example of any of the foregoing, the blade outer air seal comprises a ceramic matrix composite material.

In a further example of any of the foregoing, the coating comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

In a further example of any of the foregoing, the coating comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

A method of coating a blade outer air seal according to an exemplary embodiment of this disclosure, among other possible things includes applying an abradable coating to a blade outer air seal. The blade outer air seal includes a center web having a first surface, a second surface opposite the first surface, and first and second faces joining the first surface to the second surface. The blade outer air seal also includes first and second mounting arms extending from the second surface. The second surface has a center portion between the first and second mounting arms and first and second side portions on either side of the center portion. The abradable coating forms a first continuous coating segment on the first surface of the center web, at least one of the first and second faces, and at least one of the first and second side portions of the second surface.

In a further example of the foregoing, each of the mounting arms have an inner surface facing the center portion of the second surface and an outer surface opposite from the inner surface. The blade outer air seal also includes a second continuous abradable coating segment disposed on the center portion of the second surface and the inner surfaces of each of the mounting arms.

In a further example of any of the foregoing, the second coating segment is applied simultaneously with the first coating segment.

In a further example of any of the foregoing, the blade outer air seal comprises a ceramic matrix composite material.

In a further example of any of the foregoing, the blade outer air seal comprises a monolithic ceramic material.

In a further example of any of the foregoing, the coating comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

In a further example of any of the foregoing, the coating segment is applied by plasma spraying, slurry infiltration and sintering, or melt infiltration.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
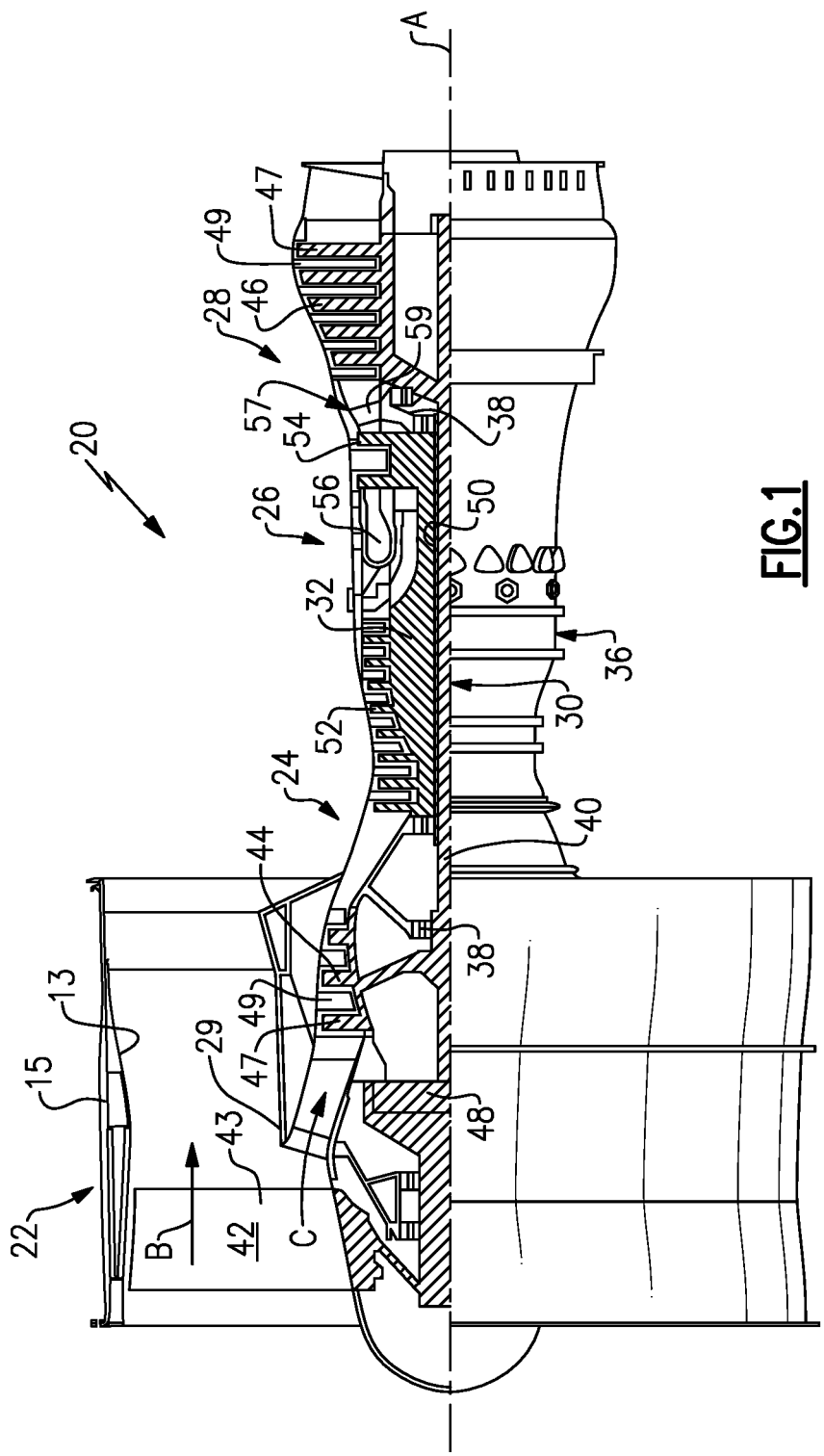
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/see divided by an industry standard temperature correction of $[(\text{Tram}\ °\text{R})/(518.7°\ \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
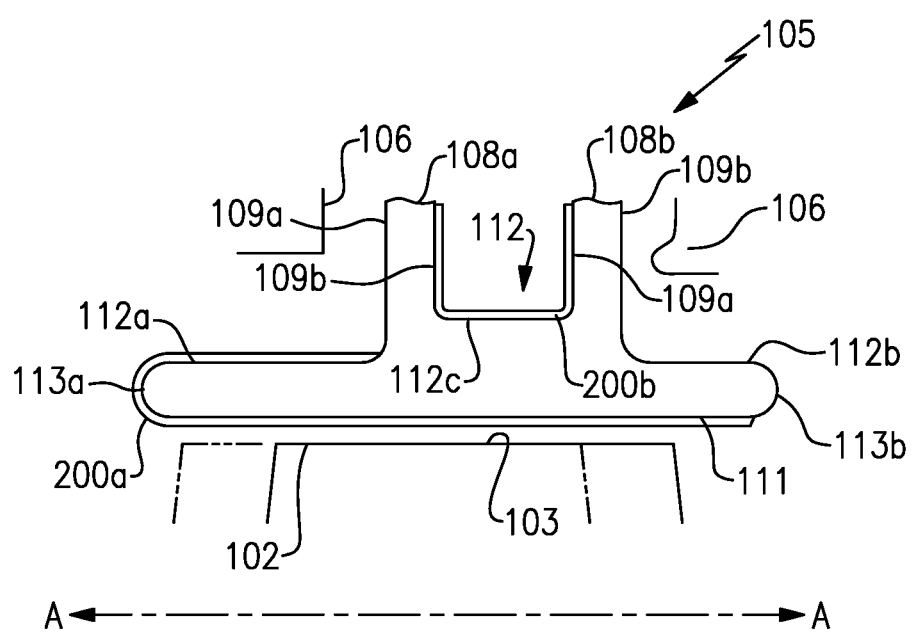
FIG. 2 shows a turbine section of the gas turbine engine of FIG. 1.

FIG. 2 shows a turbine section 28 having rotating turbine blades 102 with a radially outer tip 103. A vane is positioned upstream of the turbine blade 102 (not shown in FIG. 2). In one example the turbine blade 102 is a blade of the high pressure turbine 54 (FIG. 1). A blade outer air seal (BOAS) 105 is positioned radially outwardly of the tip 103 with respect to a central engine axis. A plurality of BOAS (not shown) are arranged circumferentially round the central engine axis.

The BOAS 105 is formed out of ceramic matrix composite materials ("CMCs") or a monolithic ceramic. A CMC material is comprised of one or more ceramic reinforcement plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcements and is formed of a single material. Example monolithic ceramics include silicon-containing ceramics, such as silicon carbide (SiC) or silicon nitride (Si3N4).

The static structure 106 may be an engine 20 casing structure.

The BOAS 105 has two mount arms 108a/108b which extend generally perpendicular from a web 110. A radially inner (with respect to the central engine axis A) surface 111 of the center web 110 is arranged adjacent the tip 103 of the turbine blade 102 when the BOAS 105 is attached to the static structure 106. As such, the radially inner surface 111 is in the gaspath of the engine 20. The radially inner surface 111 may include one or more coatings to enhance its wear, temperature, and environmental resistance. The coatings can include environmental barrier coatings or thermal barrier coatings, examples of which are known in the art. In addition, the radially inner surface 111 may include an abradable coating, which can accommodate rubbing of the tip 103 against the BOAS 105.

The BOAS 105 has other, non-gaspath surfaces which are not exposed to the engine gaspath. For instance, the web 110 has a radially outer surface 112, which includes a forward portion 112a, an aft portion 112b, and a center portion 112c between the mounting arms 108a/108b. In addition, the mounting arms 108a/108b, which extend in a radially outer direction from the radially outer surface 112, e.g., away from the gaspath, each have forward and aft surfaces 109a/109b, respectively. The aft surface 109b of the mounting arm 108a and the forward surface 109a of the mounting arm 108b face inward towards the center portion 112c while the forward surface 109a of the mounting arm 108a and the aft surface 109b of the mounting arm 108b face outward with respect to the center portion 112c. In conventional BOAS 105, these non-gaspath surfaces do not include coatings.

However, it has been discovered that application of at least an abradable or machinable coating to one or more of these non-gaspath surfaces can improve the lifetime of the BOAS 105 as will be discussed herein. Other coatings such as thermal barrier coatings or environmental barrier coatings, which are known in the art, could be used together with the abradable coating. Though the non-gaspath surfaces are not subject to abrasion as the radially inner surface 111 is due to possible tip 103 rub, the abradable coating is relatively easy to apply, cost-effective, and provides a measure of thermal protection to the BOAS 105. Specifically, the BOAS 105 is subject to a temperature gradient because the radially inner surface 111 is subject to hot gaspath temperatures while the radially outer surface 112 and mounting arms 108a/108b are not.

To that end, FIG. 2B shows a coated BOAS 105. The BOAS 105 includes an abradable coating 200 on the radially inner surface 111, at least a portion of the radially outer surface 112, and optionally, the forward and aft surfaces 109a/109b of the mounting arms 108a/108b. The coating 200 may be or include, for example, rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof. In a particular example, the abradable coating 200 includes at least one of hafnon, zircon, and mullite.

Application of the abradable coating 200 on the non-gaspath surfaces reduces the temperature gradient across the BOAS 105. For at least a CMC BOAS 105, this in turn reduces interlaminar stresses within the BOAS and improves its longevity.

The coating 200 is applied in any suitable way known in the art, such as air plasma spraying, slurry infiltration and sintering, or melt infiltration.

In one example, the coating 200 is continuous along the radially inner surface 111 and at least a portion of the radially outer surface 112. That is, the coating 200 wraps around at least one axial face of the BOAS, such as the forward axial face 113a, the aft axial face 113b, or both and extends along the radially inner surface 111 and at least a portion of the radially outer surface.

In the particular example shown in FIG. 2, the coating 200 includes two coating sections 200a/200b. The first coating section 200a is a continuous coating that coats the radially inner surface 111, forward axial face 113a, and forward portion 112a of the radially outer face of the center web 110. The second coating section 200b is a continuous coating that coats the center portion 112c of the radially outer face, aft surface 109b of mounting arm 108a, and forward surface of 109a of mounting arm 108b. In some examples, the coating sections 200a and 200b are applied to the BOAS simultaneously according to any of the example methods discussed above.

As used herein, the term "about" and "approximately" have the typical meanings in the art, however in a particular example "about" and "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A blade outer air seal, comprising:
a center web having a first surface and a second surface opposite the first surface, and first and second faces joining the first surface to the second surface;
first and second mounting arms extending from the second surface, the second surface having a center portion between the first and second mounting arms and first and second side portions on either side of the center portion; and
a continuous abradable coating disposed on the first surface of the center web, at least one of the first and second faces, and at least one of the first and second side portions of the second surface.

2. The blade outer air seal of claim 1, wherein the continuous abradable coating is a first continuous coating segment, wherein each of the mounting arms have an inner surface facing the center portion of the second surface and an outer surface opposite from the inner surface, and further comprising a second continuous abradable coating segment disposed on the center portion of the second surface and the inner surfaces of each of the mounting arms.

3. The blade outer air seal of claim 1, wherein the blade outer air seal comprises a ceramic matrix composite material.

4. The blade outer air seal of claim 1, wherein the blade outer air seal comprises a monolithic ceramic material.

5. The blade outer air seal of claim 1, wherein the coating comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

6. A gas turbine engine, comprising:
a turbine section arranged along a central engine axis, the turbine section having a turbine with at least one blade rotatable around the central engine axis, the at least one blade having a tip; and
at least one blade outer air seal arranged radially outward from the tip and attached to an engine static structure, the blade outer air seal including:
a web having a radially inner surface adjacent the tip and a radially outer surface, a forward face and an axial face joining the radially inner surface and radially outer surface,
first and second mounting arms extending radially outward from the radially outer surface, the radially outer surface of the web having a forward portion, and aft portion, and a center portion between the first and second mounting arms, and
a continuous abradable coating disposed on the radially inner surface of the web, and at least one of the forward portion and aft portion of the radially outer surface.

7. The gas turbine engine of claim 6, wherein the continuous abradable coating is disposed on the forward portion of the radially outer surface and the forward face of the web.

8. The gas turbine engine of claim 6, wherein the continuous abradable coating is a first continuous coating segment, and further comprising a second continuous coating segment disposed on an aft surface of the first mounting arm, a forward surface of the second mounting arm, and the center portion of the radially outer surface.

9. The gas turbine engine of claim 6, wherein the blade outer air seal comprises a ceramic matrix composite material.

10. The gas turbine engine of claim 8, wherein the continuous abradable coating is disposed on the forward portion of the radially outer surface and the forward face of the web.

11. The gas turbine engine of claim 10, wherein the blade outer air seal comprises a ceramic matrix composite material.

12. The gas turbine engine of claim 11, wherein the coating comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

13. The gas turbine engine of claim 6, wherein the coating comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

14. A method of coating a blade outer air seal, comprising:
applying an abradable coating to a blade outer air seal, the blade outer air seal including a center web having a first surface, a second surface opposite the first surface, and first and second faces joining the first surface to the second surface, and first and second mounting arms extending from the second surface, the second surface having a center portion between the first and second mounting arms and first and second side portions on either side of the center portion, wherein the abradable coating forms a first continuous coating segment on the first surface of the center web, at least one of the first and second faces, and at least one of the first and second side portions of the second surface.

15. The method of claim 14, wherein each of the mounting arms have an inner surface facing the center portion of the second surface and an outer surface opposite from the inner surface, and further comprising a second continuous abradable coating segment disposed on the center portion of the second surface and the inner surfaces of each of the mounting arms.

16. The method of claim 15, wherein the second coating segment is applied simultaneously with the first coating segment.

17. The blade outer air seal of claim 1, wherein the blade outer air seal comprises a ceramic matrix composite material.

18. The blade outer air seal of claim 1, wherein the blade outer air seal comprises a monolithic ceramic material.

19. The blade outer air seal of claim 1, wherein the coating comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

20. The method of claim 14, wherein the coating segment is applied by plasma spraying, slurry infiltration and sintering, or melt infiltration.

* * * * *